INVENTOR.
Walter J. Schrenk
BY
AGENT

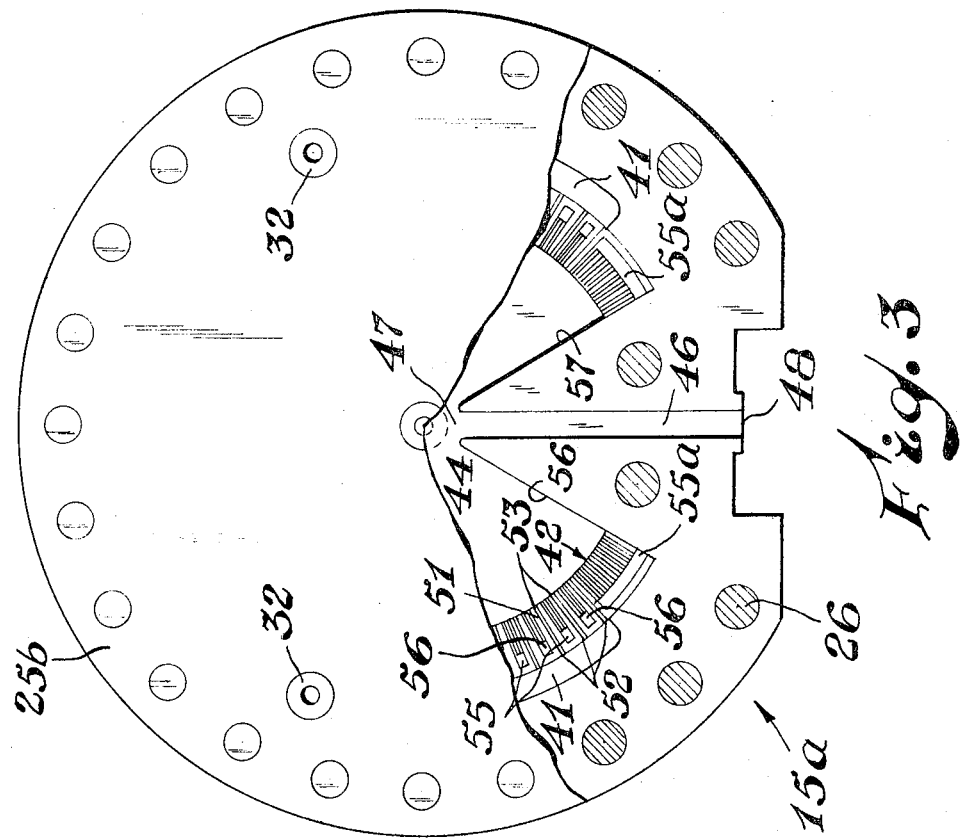
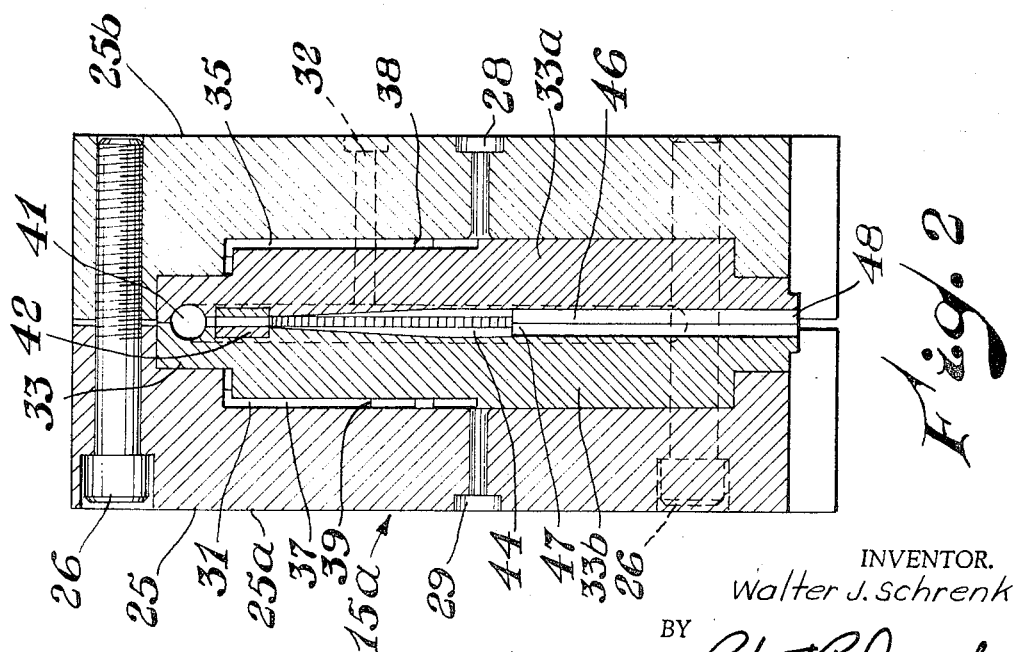

United States Patent Office 3,773,882
Patented Nov. 20, 1973

3,773,882
METHOD FOR MULTILAYER COEXTRUSION
Walter J. Schrenk, Bay City, Mich., assignor to The Dow Chemical Company, Midland, Mich.
Filed Oct. 1, 1971, Ser. No. 185,534
Int. Cl. B29d 9/00; B29f 3/06
U.S. Cl. 264—171
3 Claims

ABSTRACT OF THE DISCLOSURE

Multilayer coextrusion method is shown which provides a relatively easily obtained symmetry control of the layer thickness which is particularly suitable when the desired laminate contains many layers wherein streams of first and second thermoplastic material are divided into substreams with the resulting substreams being combined at locations which are generally disposed on an arc of a circle with the interdigitated substreams being thereafter deformed by inward flow to a discharge location generally disposed at the center of the said circle.

---

Coextrusion or simultaneous extrusion of two or more synthetic resinous materials is well known in the art as is the desirability of preparing sheet or film containing many layers; e.g., 50, 100 or several hundred layers. The method and apparatus for such extrusion is disclosed in U.S. Pats. 3,565,985; 3,576,707 and 3,557,265, herewith incorporated by reference. Two general techniques are employed for the preparation of multilayer film having a relatively high number of layers. One involves what may be considered as the extrusion of a striped tube or a tube having materials encapsulated within the walls and subsequent rotation of the outer surfaces of the tube to distribute the material of the stripes in a spiral configuration which, on examination of the tube, gives the appearance of having many parallel layers. An alternate method for the production of a many layered sheet wherein all of the layers are generally parallel basically may be considered as the simultaneous extrusion of a striped sheet, compressing the sheet in the direction of its width, expanding the sheet in the direction of its thickness to provide a sheet having a number of parallel layers which may equal or be more or less a multiple of the number of stripes originally present in a striped sheet. In effect, the edges of the originally extruded striped sheet have become the major surfaces of the layered sheet and the major surfaces of the striped sheet have become the edges. For many applications it is desirable that very precise control be achieved in the thickness of the layers of sheet or film which is ultimately extruded. In employing apparatus, for example as is illustrated in U.S. 3,557,265, where in essence the striped sheet is prepared by combining two streams in a feed block or stream divider in such a way that the streams are interdigitated, if all of the feed slots are of equal size the resultant film obtained from such an apparatus shows a small but finite gradation in thickness of the layers. The layers adjacent the surface of the film exhibit minimal thickness while the layers in the central portion exhibit maximum thickness. Correction of such variations can be accomplished by conventional die working means wherein the feed ports, slots or channels which provide polymer for the outer layers can be enlarged or reduced in an appropriate manner until the desired thickness distribution or uniformity is obtained. Such a procedure is very expensive, time consuming and dependent on a substantial amount of trial and error. One difficulty which exists in the preparation of multiple layer, simultaneously extruded films particularly employing apparatus of the nature set forth in U.S. 3,557,265, which for convenience may be referred to as a linear feed block system, is the physical length of the feed block or feed port section. If large numbers of layers are required in an extrusion apparatus, certain practical mechanical limitations, depending on the rheology of the system, dictate that the individual feed passageways be of a minimal width to avoid plugging in the event minor foreign contaminants are present in the heat plastified resinous material forwarded to the feed passageways. Dividers between the feed passageways generally must be maintained above a minimal thickness, depending upon the particular material of construction in order to resist deformation due to any pressure unbalance between adjacent passageways and to reasonably resist damage during service, manufacture, assembly and disassembly of the apparatus when cleaning or adjustment is necessary.

It would be desirable if there were available an improved method for the preparation of multilayer, simultaneously extruded bodies which would provide substantially greater uniformity of layer thickness in the final product without the necessity of individual adjustment of feed passageways.

These benefits and other advantages in accordance with the present invention are achieved in a method for the preparation of a composite stream of interdigitated diverse synthetic resinous material, the steps of the method comprising providing at least a first stream of a heat plastified synthetic resinous material and a second stream of heat plastified thermoplastic material, dividing each of the streams into a plurality of first substreams, and a plurality of second substreams respectively, combining the substreams to form a composite stream having the first substreams and the second substreams interdigitated, deforming the composite stream by causing the subtream to flow in a generally radially inward manner to a dicharge location, the discharge location being generally equidistant from locations of combination of adjacent first and second substreams.

Further features and advantages of the present invention will become more apparent from the following specification taken in connection with the drawing wherein:

FIG. 1 schematically represents preparation of multilayer film employing apparatus for practice of the method of the present invention.

FIG. 2 is a schematic sectional representation of stream combining apparatus of FIG. 1.

FIG. 3 is a schematic partially cutaway view of the apparatus of FIG. 2.

Figure 4:
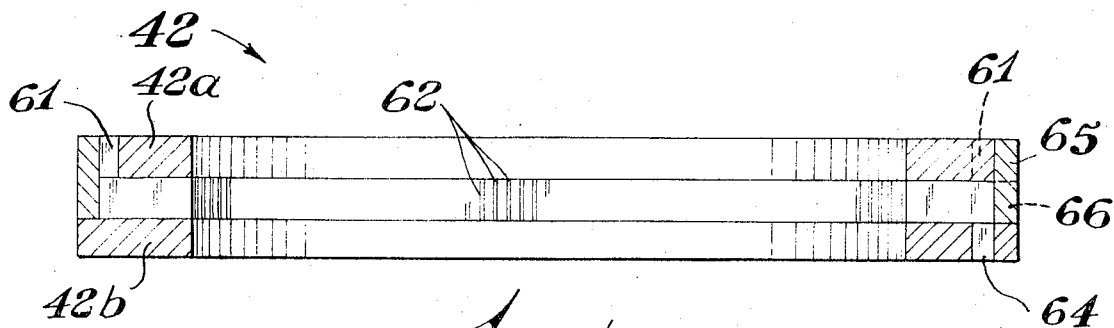
Figure 5:
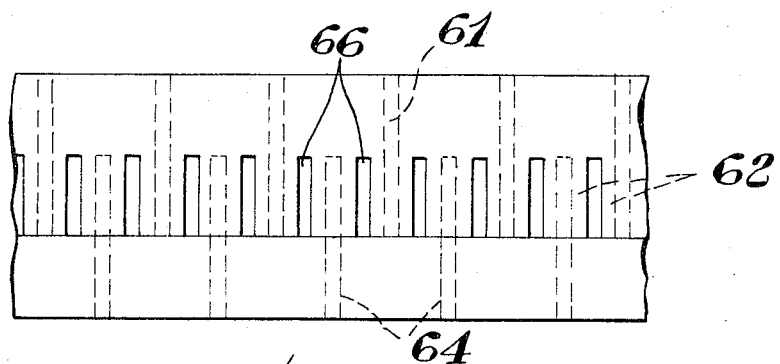

FIGS. 4 and 5 schematically depict views of the stream divider of the apparatus of FIGS. 2 and 3.

Figure 1:
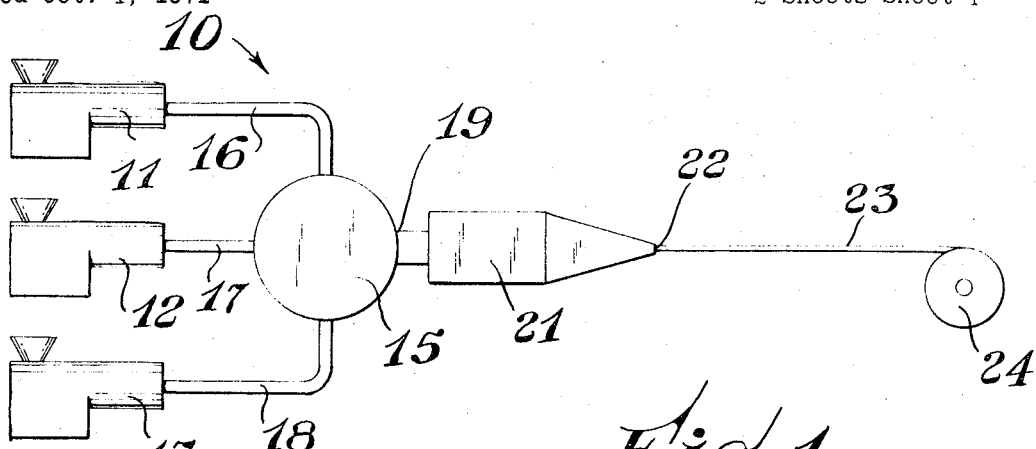

In FIG. 1 there is schematically depicted apparatus for practice of the method of the present invention generally designated by the reference numeral 10. The apparatus 10 comprises in cooperative combination first, second and third sources of heat plastified thermoplastic resinous material designated as 11, 12 and 13, respectively, which beneficially are extruders. A stream combining means 15 is in operative communication with the extruders 11, 12 and 13 by suitable conduits 16, 17 and 18, respectively. The apparatus or stream combining means 15 has a discharge means 19 which is in operative communication with a stream shaping means or film or sheeting die 21. The die 21 has a generally slot-like extrusion orifice 22. A laminate or multilayer stream 23 is passed from the orifice 22 and wound onto the roll 24. The die 21 may have a convenient shape or configuration generally employed in the art of multiple extrusion. Such dies are well known and some are schematically depicted in U.S. Pats. 3,397,428; 3,399,105; 3,423,498; 3,479,425; 3,487,505; 3,511,903; 3,549,505; 3,555,128; 3,557,265 and 3,565,985, herewith incorporated by reference.

In operation of the apparatus of FIG. 1, the sources 11, 12 and 13 supply heat plastified synthetic resinous material through the conduits 16, 17 and 18, respectively, to the combining apparatus 15 wherein the streams are divided, interdigitated and passed to the discharge 19 to form a composite layered stream having layers parallel to the die orifice 22. Within the die 21 flow rate is maintained to permit streamlined flow and the steam is deformed into the film 23 which is cooled by means not shown and wound onto the roll 24.

FIG. 2 is a schematic representation of a section through a stream combining means 15a. The operation of the stream combining means 15a is generally similar to that of the stream combining means 15 of FIG. 1. The stream combining means 15a comprises a body 25. The body 25 comprises a first outer portion 25a and a second outer portion 25b. The first and second body portions 25a and 25b are held in fixed relationship by a plurality of fasteners 26 such as cap screws. The body or housing 25 defines a first inlet port or passage 28 generally axially extending and a second polymer inlet 29 also generally axially extending. Within the body 25 is a generally cylindrical cavity 31 which is in full communication with the passages 28 and 29. A body portion 25b defines two third polymer inlet passages 32 generally displaced but parallel to the axially disposed passages 28 and 29. Within the cavity 31 is a second or inner housing 33 composed of a first housing portion 33a and a second housing portion 33b. The first housing portion 33a and the housing portion 25b define a first polymer receiving cavity 35 which is of generally discoidal configuration. The inner housing portion 33b and the outer housing portion 25a define a second plenum 37 also of generally discoidal configuration. A plurality of stiffening ribs 38 integral with the portion 25b radially extend between the inner housing portion 33a and the housing portion 25b within the plenum 35. Similar ribs 39 integral with the housing portion 25a are disposed in the plenum 37. Generally peripherally disposed within the housing 33 is a third plenum 41 having the configuration of a major radial segment of a toroid. The plenum 41 is in communication with the third passages 32. A stream dividing means 42 is disposed within the inner housing 33 and has defined therein a plurality of passages which are selectively in communication with one of the plenums 35, 37 or 41. Within the housing 33 and internal to the stream divider 42 is a generally discoidal cavity 44 adapted to receive streams flowing from the divider 42. A discharge passage 46 is defined by the inner body portions 33a and 33b. The passage 46 has an inlet end 47 and a discharge end 48. The inlet end 47 is generally equidistant from the discharge locations of the distributor 42.

In FIG. 3 there is depicted a schematic partially cutaway plan view of the distributor 15a with a portion of the body portion 25b removed and a portion of the inner body portion 33b removed. The distributor 42 has disposed therein a plurality of slots or feed passages 51 which communicate with the plenum 41. The slots 51 have an inlet opening 52 adjacent the plenum 41 and outlet openings 53 discharging into the third plenum 44. A series of passages 55 disposed intermediate some of the passages 52 communicate with the plenum 37, not shown. The passages 55 as depicted in FIG. 2 are bifurcated and terminate at their discharge end generally adjacent the discharge ends 53 of the passages 51. Similar bifurcated passages 56 are provided in alternating arrangement and communicate with the plenum 35 and terminate adjacent the discharge ends 53 of the passages 51. The plenum 44 has a generally discoidal configuration with a sector removed and terminates at surfaces 56 and 57, and the surfaces 56 and 57 are generally radially and axially extending. At the terminal portions of the stream dividing means 42 are provided major polymer passages 55a which are in communication with the plenum 35 and communicate with a plurality of minor passages similar in dimension to the passages 51 and terminate at a location generally equidistant from the center of the distributor 42.

FIG. 4 is a sectional schematic representation of the construction of the stream divider 42. The divider 42 consists of a first body portion 42a having a plurality of peripheral, generally axially extending passages 61. A plurality of radially extending fin-like elements 62 define therebetween radially extending passages, some of which communicate with the passages 61. A second body portion 42b of generally annular configuration is disposed generally in contact with the fin-like elements 62. The body portion 42b defines a plurality of peripherally disposed generally axially directed passages 64 adapted to communicate with the passages defined between the fin-like elements 62. A peripheral ring 65 is disposed about the body portion 42a and has defined therein a plurality of slots 66 adapted to communicate with spaces between the fin-like elements 62.

FIG. 5 schematically depicts a view of the distributor 42 looking radially inward showing the locations of the passages 64, 61 and 66, each of the passages 61, 64 and 66 being in full communication with a passage 62a defined between adjacent fins 62. For purposes of clarity of illustration, alternate fins 62 which bifurcate the passages have been omitted.

In operation of the apparatus as depicted in FIGS. 2–5, the first polymer is introduced into the polymer passage 28 which in turn flows into the plenum 35, is discharged into the pasage 56 and between the fins 62 and is discharged into the plenum 44. A substantially greater portion is discharged to the passage 55a adjacent the surfaces 56 and 57. The second polymer is introduced into the passage 29 which in turn flows into the plenum 37 and is taken from the plenum 37 by the passage 56 and discharged by the communicating pasages 66 into the plenum 44 between materials coming from the plenum 35. The third material is introduced into the plenum 41 and flows through the passages 66 into the mating passages 62a, thus providing a radially inwardly flowing stream of a desired layered configuration. As the resultant stream flows inwardly and approximately a distance equidistant from the entrance 47 of the discharge passage 46, the layer thickness of the various layers in the composite stream is proportional to the number of passages 62a, assuming equal volumetric flow through the passage.

The apparatus for practice of the method of the present invention is employed with particular advantage in the extrusion of synthetic resinous composite film and sheet. Employing an apparatus such as hereinbefore set forth, a substantial improvement in uniformity of film layer is obtained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not be construed or interpreted as being restrictive or otherwise limiting of the present invention.

What is claimed is:

1. A method for the preparation of a composite stream of interdigitated diverse synthetic resinous materials, the steps of the method comprising
providing at least a first stream and a second stream of heat plastified extrudable thermoplastic material,
dividing each of the streams into a plurality of first substreams and a plurality of second substreams, respectively,
combining the substreams to form a composite stream having the first substreams and the second substreams interdigitated, with the further limitation that the substreams are combined at locations which are generally disposed on an arc of a circle,
deforming the composite stream by causing the substreams thereof to flow in a generally radially inward manner to a discharge location generally disposed at the center of the circle, the discharge location being generally equidistant from locations of combination of adjacent first and second substreams,
removing the composite stream from the discharge location, and
deforming the stream into a generally sheet-like configuration wherein the interfaces between the substreams are generally parallel to the major surfaces of the sheet-like configuration.

2. The method of claim 1 wherein the composite stream between its location of combination and the discharge location has the general configuration of a sector of a circle.

3. The method of claim 2 wherein the sector of the circle is a major sector of the circle.

References Cited
UNITED STATES PATENTS

| | | | |
|---|---|---|---|
| 3,494,993 | 2/1970 | Breidt, Jr. et al. | 264—171 |
| 3,557,265 | 1/1971 | Chisholm et al. | 264—171 |
| 3,673,291 | 6/1972 | Rasmussen | 264—173 |
| 3,565,985 | 2/1971 | Schrenk et al. | 264—171 |
| 3,576,707 | 4/1971 | Schrenk et al. | 264—171 |
| 3,558,755 | 1/1971 | Laban et al. | 264—171 |

ROBERT F. WHITE, Primary Examiner

J. R. THURLOW, Assistant Examiner

U.S. Cl. X.R.

264—349